United States Patent
Oowatari

(10) Patent No.: US 10,507,987 B2
(45) Date of Patent: Dec. 17, 2019

(54) SUPPLY DEVICE CONFIGURED TO SUPPLY WORKPIECE TO TAKE-OUT DEVICE AND TRANSPORT DEVICE EQUIPPED WITH SUPPLY DEVICE

(71) Applicant: FANUC CORPORATION, Yamanashi (JP)

(72) Inventor: Hiroshi Oowatari, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/034,358

(22) Filed: Jul. 13, 2018

(65) Prior Publication Data

US 2019/0023501 A1 Jan. 24, 2019

(30) Foreign Application Priority Data

Jul. 20, 2017 (JP) .................................. 2017-141239

(51) Int. Cl.
| | |
|---|---|
| *B65G 47/14* | (2006.01) |
| *B25J 9/16* | (2006.01) |
| *B25J 9/00* | (2006.01) |
| *B65G 47/90* | (2006.01) |

(52) U.S. Cl.
CPC ........ *B65G 47/1457* (2013.01); *B25J 9/0093* (2013.01); *B25J 9/1664* (2013.01); *B25J 9/1669* (2013.01); *B25J 9/1687* (2013.01); *B25J 9/1697* (2013.01); *B65G 47/905* (2013.01); *B65G 2201/047* (2013.01); *G05B 2219/37555* (2013.01)

(58) Field of Classification Search
CPC .................................................. B65G 47/1457
See application file for complete search history.

(56) References Cited

U.S. PATENT DOCUMENTS

| | | | | |
|---|---|---|---|---|
| 4,795,957 A | * | 1/1989 | MacNeal, Jr. | ......... B25J 9/1676 200/334 |
| 5,386,762 A | * | 2/1995 | Gokey | .................... A47J 27/14 414/225.01 |
| 6,311,825 B1 | * | 11/2001 | Schmitt | .............. B65G 47/1457 198/392 |
| 9,776,808 B1 | * | 10/2017 | Ooba | .................... B65G 47/268 |
| 10,246,257 B1 | * | 4/2019 | Battles | .................... B65G 21/18 |

(Continued)

FOREIGN PATENT DOCUMENTS

| | | |
|---|---|---|
| DE | 102018205442 A1 | 11/2018 |
| JP | H8-323669 A | 12/1996 |

(Continued)

*Primary Examiner* — Thomas Randazzo
(74) *Attorney, Agent, or Firm* — Hauptman Ham, LLP

(57) ABSTRACT

A supply device includes a replenishment device configured to replenish bolts to a surface of a table, and a supply control device configured to control the replenishment device. A determination region for determining the number of bolts is predetermined in a region where the table is disposed. When the number of bolts detected in the determination region is less than a determination value, the supply control device selects a divided region having the lowest bolt number density from among a plurality of divided regions. The supply control device controls the replenishing device so as to replenish bolts to a region of the table corresponding to the selected divided region.

5 Claims, 10 Drawing Sheets

(56) References Cited

U.S. PATENT DOCUMENTS

| | | | |
|---|---|---|---|
| 2006/0057239 A1* | 3/2006 | Hariki | B65G 47/1457 425/126.1 |
| 2007/0108109 A1* | 5/2007 | Erlandsson-Warvelin | B25J 9/1694 209/629 |
| 2013/0238128 A1* | 9/2013 | Suzuki | B25J 9/1669 700/258 |
| 2014/0025197 A1 | 1/2014 | Mattern et al. | |
| 2016/0379370 A1* | 12/2016 | Nakazato | G01B 11/24 382/103 |
| 2018/0374144 A1* | 12/2018 | Smilowitz | B25J 9/1687 |

FOREIGN PATENT DOCUMENTS

| | | |
|---|---|---|
| JP | H11-180538 A | 7/1999 |
| JP | 2001-520364 A | 10/2001 |
| JP | 2002-255339 A | 9/2002 |
| JP | 2013-82054 A | 5/2013 |
| JP | 2016-26966 A | 2/2016 |
| JP | 2017-30097 A | 2/2017 |
| WO | 2014/168241 A1 | 10/2014 |

\* cited by examiner

SUPPLY DEVICE CONFIGURED TO SUPPLY WORKPIECE TO TAKE-OUT DEVICE AND TRANSPORT DEVICE EQUIPPED WITH SUPPLY DEVICE

RELATED APPLICATIONS

The present application claims priority of Japanese Application No. 2017-141239, filed Jul. 20, 2017 the disclosure of which is hereby incorporated by reference herein in its entirety.

BACKGROUND OF THE INVENTION

1. Field of the Invention

The present invention relates to a supply device configured to supply a workpiece to a take-out device, and a transport device equipped with the supply device.

2. Description of the Related Art

In factories or the like where products are manufactured, there are processes for moving workpieces and processes for attaching workpieces to predetermined members, the like. It is known et the transport of such workpieces can be performed by using devices such as the robot or the like.

When workpieces are transported to factories the e, there are cases where a large number of workpieces are stored in containers such as bags or boxes. For example, small parts such as electronic components and bolts are stored in containers without being organized. In short, small parts are stored in containers in a bulk state. Since the workpieces vary in orientation, there are cases where it can be difficult to take out workpieces with a take-out device such as a robot or the like. For this reason, in order to make it easier for take-out devices to take out workpieces, the supply device configured to supply workpieces to the take-out device in a state in which the workpieces do not overlap with each other is known.

The Device including a conveyor for transporting workpieces is known as the supply device. Also, the transport device for using the robot so as to take out workpieces transported by the conveyor is known (e.g., JP 08-323669 A). In addition, the device for placing a tray containing parts on the surface of a rotation device and rotating the tray is known (e.g., JP 2013-82054 A). Further, the supply device configured to supply workpieces to a robot after adjusting the orientation of the workpieces during transportation of the workpieces is known (e.g., JP 2017-30097 A).

Summary of Invention

The device for placing the workpiece on an upper surface of a table and rotating the table is known as the supply device for supplying workpieces to the robot or the like. The workpiece circulates in accordance with the rotation of the table. The robot can take out the workpiece that moves when the table rotates.

As the robot takes out workpieces, the number of workpieces placed on the table decreases. Accordingly, it is possible to arrange a replenishment device configured to replenish the workpieces on the table. In the related art, the replenishment device replenishes the workpieces at predetermined time intervals. Alternatively, the replenishment device replenishes workpieces when the robot had taken out a predetermined number of workpieces.

In addition, the replenishment device replenishes workpieces to a predetermined position of the table. For this reason, there are a region where workpieces are crowded, as well as a region where workpieces are dispersed on the surface of the table. That is, there are the region where the workpiece number density is high and the region where the workpiece number density is low on the surface of the table.

In the region where the workpiece number density is high, there are cases where it is difficult for the robot to grip the workpiece. For example, when a plurality of workpieces are in contact with one another, there are cases where a hand attached to the robot cannot grip a workpiece. In contrast, in the region where the workpiece density is low, there are cases in which all the workpieces arranged within the operational range of the robot can be taken out. In this case, the robot cannot take out a workpiece, and stops. In this way, in the region where the workpiece density is high and the region where the workpiece density is low, the efficiency in taking out the workpiece is poor.

Accordingly, it is preferable that the supply device supplies the workpieces such that the robot can easily grip the workpiece, and also supplies the workpieces such that the robot does not stop. In short, it is preferable that the supply device efficiently supplies the workpieces to the take-out device.

One aspect of the present disclosure relates to a supply device configured to supply a workpiece to a take-out device configured to take out a workpiece. The supply device includes a placement member on which the workpiece is placed and a drive motor configured to rotate the placement member. The supply device includes a detection device configured to detect the workpiece placed on the placement member. The supply device includes a replenishment device configured to replenish the workpiece to a surface of the placement member and a supply control device configured to control the replenishment device. The replenishment device is formed so as to be able to replenish the workpiece to plurality of positions in a region where the placement member is disposed. A determination region for determining a number of workpieces is predetermined in the region where the placement member is disposed. A plurality of divided regions are predetermined in the determination region. The supply control device includes a workpiece detection unit configured to detect a number of workpieces in the entire determination region based on information detected by the detection device. The supply control device includes a region selection unit configured to select, when the number of workpieces detected by the workpiece detection unit is less than a predetermined determination value, a divided region having a lowest number density of workpieces from among the plurality of the divided regions. The supply control device is configured to control the replenishment device to replenish the workpiece in a region of the placement member corresponding to the divided region selected by the region selected unit.

Another aspect of the present disclosure relates to a transport device including the above-described supply device, a take-out device configured to take out a workpiece placed on the placement member, and a take-out control device configured to control the take-out device. The detection device is configured to detect a position and orientation of the workpiece. A detection region for detecting the position and orientation of the workpiece by the detection device and a gripping region in which the workpiece is gripped by the take-out device are predetermined in the region where the placement member is disposed. The gripping region is disposed downstream from the detection region in a direction in which the placement member rotates, and is disposed upstream from the determination region. The take-out control device is configured to calculate the position and orientation of the workpiece in the gripping region based on the position and orientation of the workpiece in the detection region. The take-out control device is configured to control the take-out device to grip the workpiece based on the position and orientation of the workpiece in the gripping region.

DETAILED DESCRIPTION

A supply device and a transport device that includes the supply device according to an embodiment will be described with reference to FIG. 1 to FIG. 12. The supply device of the present embodiment supplies a workpiece to a take-out device. In the transport device of the present embodiment, the take-out device changes the orientation of the workpiece and arranges the workpiece at a predetermined position.

Figure 1:
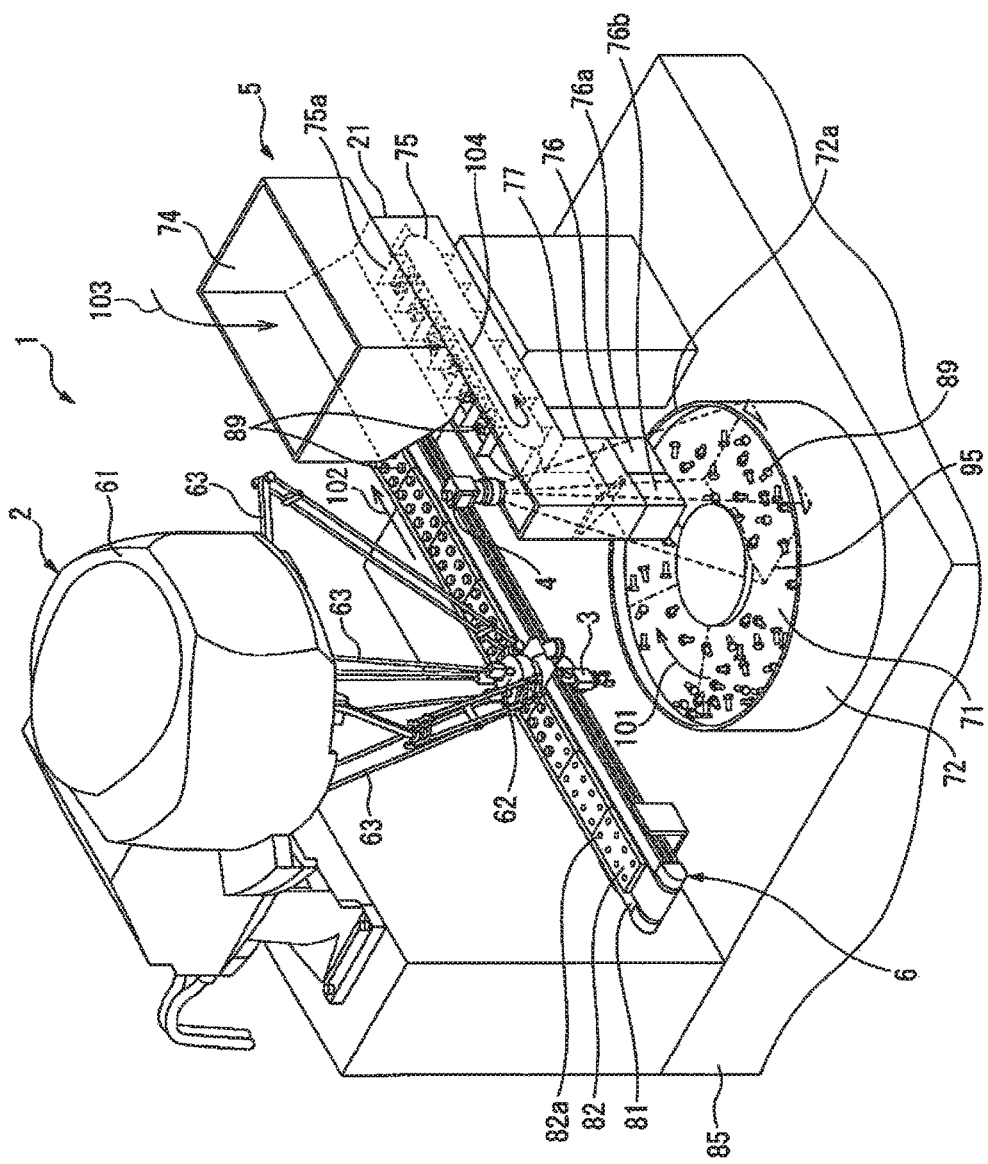
FIG. 1 is a perspective view of a transport device according to an embodiment.

FIG. 1 illustrates a perspective view of a transport device according to the present embodiment. In the present embodiment, a bolt 89 will be described as an example of a workpiece taken out by the take-out device. The transport device 1 includes a robot 2 serving as a take-out device configured to take out the bolt 89 from the supply device 5. The transport device 1 includes a supply device 5 for supplying the bolt 89 to the robot 2. The transport device 1 includes an export device 6 for exporting the bolt 89 taken out by the robot 2. The robot 2, the supply device 5, and the export device 6 are supported by a mount 85.

The supply device 5 of the present embodiment includes a table 71 serving as a placement member on which the bolt 89 is placed. In the table 71 of the present embodiment, the placement surface is formed in an annular shape. The outer contour of the table 71 is formed in a substantially circular shape. The supply device 5 includes a table drive motor 36 for rotating the table 71. The table 71 is rotated in the direction indicated by the arrow 101 by the table drive motor 36.

The table drive motor 36 can rotate the table 71 at a constant rotation speed, for example. The placement surface on which the bolt 89 of the table 71 is placed is formed in a planar shape. In addition, the placement surface is formed so as to extend in the horizontal direction.

The supply device 5 includes a frame body 72 surrounding the table 71. The frame body 72 includes a wall portion 72a surrounding the table 71 such that the bolts 89 do not fall from the table 71. The table 71 and the table drive motor 36 are supported by the frame body 72.

The supply device 5 includes a replenishment device 21 for replenishing bolts 89 to the surface of the table 71. The replenishment device 21 may also be referred to as a hopper. The replenishment device 21 includes an injection box 74 for injecting new bolts 89. As indicated by the arrow 103, the bolts 89 to be replenished are injected into the injection box 74. For example, a worker can supply bolts 89 to the injection box 74 in accordance with the operation of the robot 2 taking out the bolts 89. Alternatively, the worker can supply bolts 89 to the injection box 74 at predetermined time intervals.

The replenishment device 21 includes a conveyor 75 for transporting the bolts 89 injected into the injection box 74. The conveyor 75 includes crosspieces 75a for seizing the bolts 89. The crosspieces 75a are formed, for example, at predetermined intervals. The conveyor 75 is driven in the direction indicated by the arrow 104 so as to transport the bolts 89. The replenishment device 21 includes a discharge part 76 for exporting the bolts 89 transported by the conveyor 75 to the table 71.

The robot 2 of the present embodiment is a parallel link robot. The robot 2 takes out the circulating bolt 89 that is placed on the table 71. The robot 2 includes a plurality of links 63 and a base portion 61 that supports the plurality of links 63. The robot 2 includes a movable plate 62 supported by the plurality of links 63. The movable plate 62 is disposed at the tips of the plurality of links 63. Robot drive motors 17 for driving the respective links 63 are disposed inside the base portion 61. The robot 2 is formed such that the position and orientation of the movable plate 62 can be changed by driving the plurality of links 63. In other words, the position and orientation of the robot 2 change when the robot drive motors 17 are driven.

A hand 3 serving as a work tool is connected to the movable plate 62. The hand 3 of the present embodiment includes a pair of finger portions that operate by pneumatic pressure. By closing the finger portions together, a bolt 89 can be gripped. Also, by opening the fingers together, the bolt 89 can be released. The work tool is not limited to this embodiment, and any device that is capable of gripping or releasing the workpiece can be utilized. For example, the work tool may be formed so as to grip the workpiece by suction.

The export device 6 of the present embodiment may be disposed within the range that the hand 3 can reach. The export device 6 includes a pallet 82 for placing the bolts 89 and a conveyor 81 for moving the pallet 82. In the pallet 82, a hole 82a that extends in the vertical direction is formed. The robot 2 moves the bolt 89 such that the screw portion of the bolt 89 is inserted into the hole 82a. Bolts 89 are disposed in each respective hole 82a. The pallet. 82 on which the bolts 89 are disposed is transported by the conveyor 81 in the direction indicated by the arrow 102.

The transport device 1 includes an imaging device 50 for capturing an image of the bolt 89 placed on the table 71. The imaging device 50 functions as a detection device that detects the bolts 89 placed on the table 71, The imaging device 50 of the present embodiment includes a camera 4 supported by a support member (not illustrated in the drawings). The imaging device 50 includes an imaging control device 51 for controlling the camera 4. Based on the image captured by the camera 4, the position and orientation of the bolt 89 on the table 71 are detected. The camera 4 of the present embodiment is a two-dimensional camera. The camera 4 is not limited to a two-dimensional camera and any camera that is capable of detecting the position and orientation of the workpiece placed on the table can be utilized. For example, the imaging device may include a three-dimensional camera.

Figure 2:
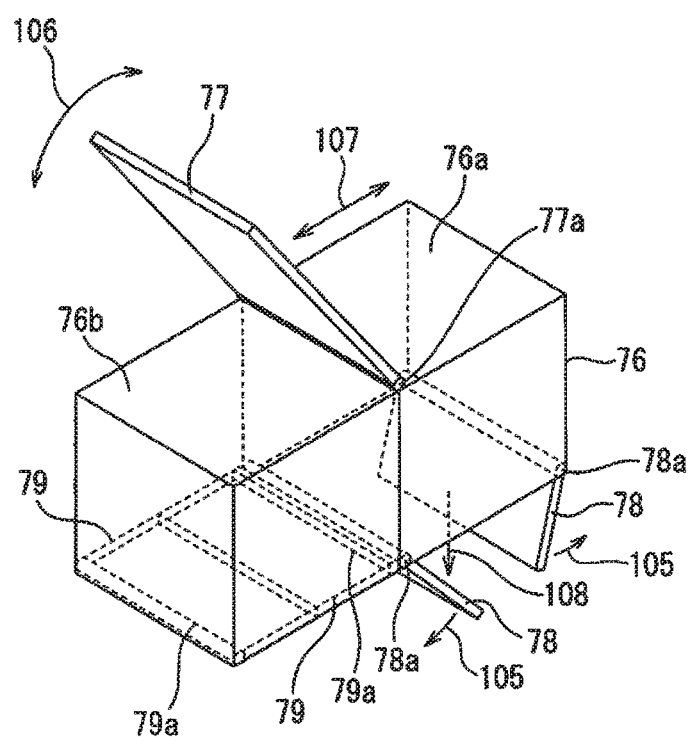
FIG. 2 is an enlarged perspective view of a discharge part of a replenishment device according to the embodiment.

FIG. 2 illustrates an enlarged perspective view of a part for discharging workpieces of the replenishment device according to the present embodiment. With reference to FIG. 1 and FIG. 2, the discharge part 76 of the replenishment device 21 is formed so as to be able to replenish the bolts 89 at a plurality of positions in the region where the table 71 is arranged. The discharge part 76 includes a plurality of storage chambers 76a, 76b for temporarily storing the bolts 89. The plurality of storage chambers 76a, 76b are arranged side by side in the radial direction of the table 71 indicated by the arrow 107. The first storage chamber 76a is disposed radially outward. The second storage chamber 76b is disposed radially inward.

A distribution plate 77 is disposed above the first storage chamber 76a and the second storage chamber 76b. As indicated by the arrow 106, the distribution plate 77 is formed so as to rotate around the rotation shaft 77a as a rotation axis. The distribution plate 77 is driven by a distribution plate drive motor 26. The distribution plate 77 distributes the bolts 89 transported by the conveyor 75 to the first storage chamber 76a or the second storage chamber 76b. For example, as illustrated in FIG. 1 and FIG. 2, the bolts 89 can be distributed to the first storage chamber 76a by arranging the distribution plate 77 so as to cover the second storage chamber 76b.

A discharge port through which the bolts 89 are discharged is formed at the bottom of the first storage chamber 76a. A closing plate 78 is arranged at the discharge port as a closing member. The closing plate 78 is formed so as to rotate about the rotation shaft 78a as a rotation axis. A discharge port through which the bolts 89 are discharged is formed at the bottom of the second storage chamber 76b. A closing plate 79 is arranged at the discharge port serving as a closing member. The closing plate 79 is formed so as to rotate about the rotation shaft 79a as a rotation axis. Each of the closing plates 78, 79 is formed so as to be rotated by the closing plate drive motor 27.

When the bolt 89 stored in the first storage chamber 76a is supplied, the closing plate 78 is driven as indicated by the arrow 105. The discharge port of the first storage chamber 76a is opened. The bolt 89 is supplied to an outer portion in the region of the table 71 as indicated by the arrow 108. In addition, when a bolt 89 stored in the second storage chamber 76b is supplied, the closing plate 79 is rotated. The discharge port of the second storage chamber 76b is opened. The bolt 89 is supplied to an inner portion in the region of the table 71.

When a bolt 89 is discharged from the first storage chamber 76a or the second storage chamber 76b, the replenishment device 21 can drive the conveyor 75 and the distribution plate 77 so as to supply a new bolt to the storage chamber from which the bolt 89 has been discharged.

Thus, the replenishment device 21 of the present embodiment includes a discharge part 76 having a plurality of discharge ports aligned in a row in a direction perpendicular to the rotation direction of the table 71. Although the discharge part has two discharge ports in the present embodiment, the embodiment is not limited to this, and three or more discharge ports may be provided. In addition, the plurality of discharge ports may be arranged in the rotation direction of the table.

It should be noted that the replenishment device is not limited to this embodiment, and any device that is capable of replenishing workpieces to a plurality of positions can be utilized. For example, one discharge port may be formed in the discharge part, and a robot or the like may be configured to move the discharge part in the radial direction of the table. Alternatively, the discharge part may include a guide plate for dropping workpieces after they have rolled, and a motor for changing the orientation of the guide plate.

Figure 3:
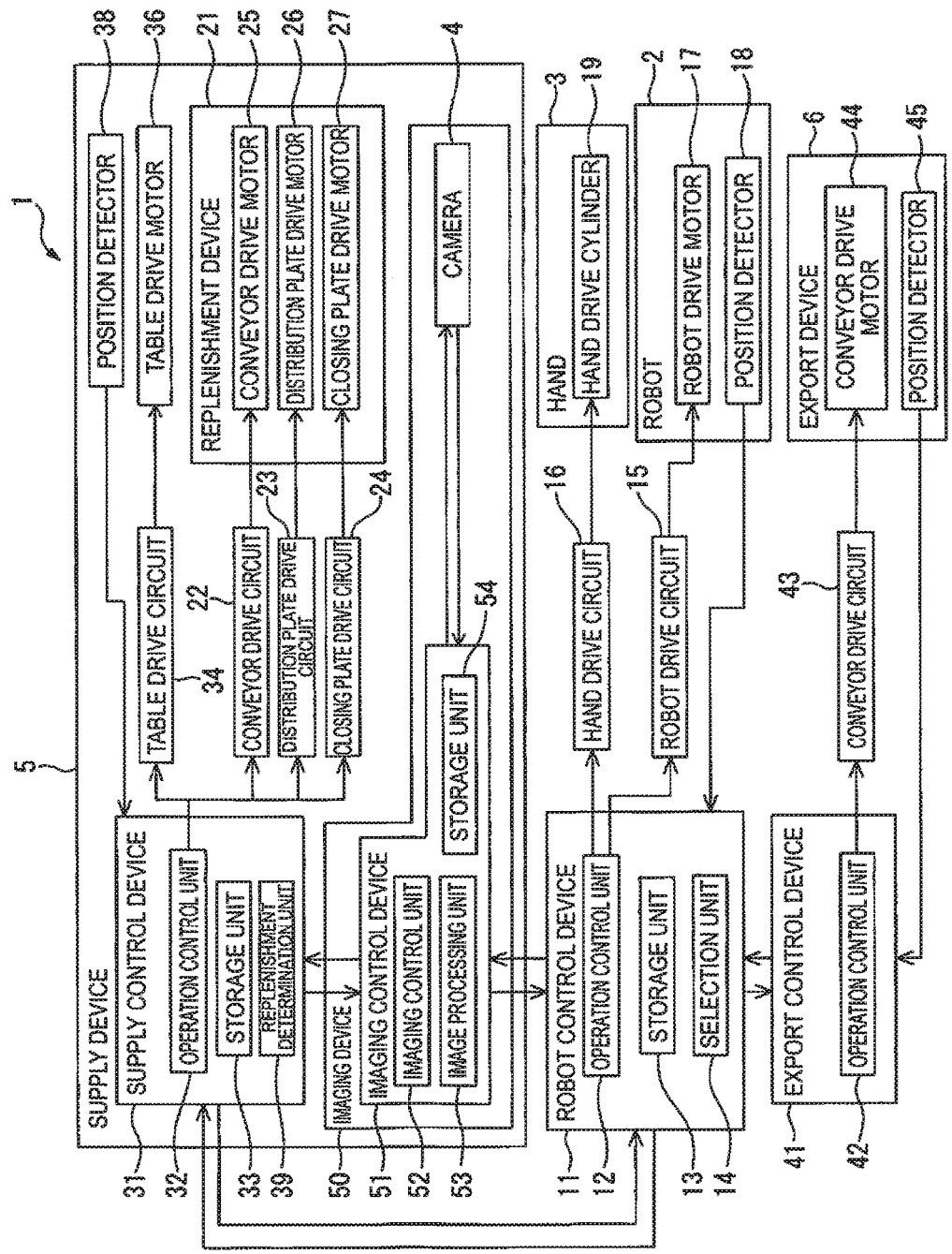
FIG. 3 is a block diagram of the transport device according to the embodiment.

FIG. 3 illustrates a block diagram of the transport device according to the present embodiment. The transport device 1 includes a control device. The control device of the transport device 1 includes a robot control device 11 that controls the robot 2 and the hand 3. The robot control device 11 functions as the take-out control device configured to control the take-out device. The robot control device 11 includes an arithmetic processing device having a CPU (Central Processing Unit) as a processor, and a RAM (Random Access Memory) and a ROM (Read Only Memory) that are connected to the CPU via a bus. The arithmetic processing device is constituted by a computer, for example.

The robot control device 11 includes a storage unit 13 for storing arbitrary information. The storage unit 13 stores information related to control of the robot 2 and control of the hand 3. For example, the storage unit 13 stores an operation program for the robot 2 and the hand 3. In addition, the storage unit 13 stores information input to an operation panel connected to the robot control device 11.

The robot control device 11 includes an operation control unit 12 that controls the robot 2 and the hand 3. The operation control unit 12 transmits an operation command based on the operation program to a robot drive circuit 15. The robot drive circuit 15 supplies electricity to the robot drive motor 17 based on the operation command. By driving the robot drive motor 17, the position and orientation of the robot 2 change. In addition, the operation control unit 12 transmits an operation command based on the operation program to the hand drive circuit 16. The hand drive circuit 16 operates a pump, a solenoid valve, and the like for supplying air based on the operation command. By driving the hand drive cylinder 19, the finger portions of the hand 3 are opened and closed.

The robot 2 includes a position detector 18 for detecting the position and orientation of the robot 2. The position detector 18 can be constituted by, for example, an encoder attached to the robot drive motor 17, for detecting a rotation angle. The robot control device 11 receives a signal relating to the rotation angle that is output from the position detector 18. The robot control device 11 detects the position and orientation of the robot. 2 based on the rotation angle.

The control device of the transport device 1 includes an imaging control device 51 that controls the camera 4. Similar to the robot control device 11, the imaging control device 51 includes an arithmetic processing device having a CPU. The imaging control device 51 includes an imaging control unit 52 for controlling the camera 4 and a storage unit 54 for storing information relating to imaging. The imaging control unit 52 transmits an imaging command to the camera 4 based on the operation program stored in the storage unit 54. The camera 4 that receives the imaging command captures an image of the surface of the table 71 on which the bolt 89 is placed.

The imaging control device 51 includes an image processing unit 53 for processing the image captured by the camera 4. The image processing unit 53 detects the position and orientation of the bolt 89 by processing the image. For example, a reference image that serves as a reference relating to the bolt 89 may be stored in the storage unit 54. The image processing unit 53 can detect the position and orientation of the bolt 89 by using a pattern matching method. That is, the image processing unit 53 can detect the position and orientation of the bolt 89 by comparing the image of the bolt 89 acquired by the camera 4 with the reference image of the bolt 89. An arbitrary position of the bolt 89 can be utilized as the position of the bolt 89. For example, the reference position of the bolt 89 can be set in the reference image. The image processing unit is not limited to this embodiment, and the position and orientation of the bolts can be detected by any control. For example, the image processing unit may detect the position and orientation of the bolt based on the brightness of the image.

The control device of the transport device 1 includes a supply control device 31 that controls the table 71 and the replenishment device 21. Similar to the robot control device 11, the supply control device 31 includes an arithmetic processing device having a CPU. The supply control device 31 includes a storage unit 33 that stores arbitrary information. The storage unit 33 stores information relating to the control of the supply device 5. In the storage unit 33, for example, an operation program for the supply device 5 is stored.

The supply control device 31 includes an operation control unit 32 that controls the table 71 and the replenishment device 21. The operation control unit 32 transmits an operation command to the table drive circuit 34 based on the operation program. The table drive circuit 34 supplies electricity to the table drive motor 36 based on the operation command. The table drive motor 36 is driven so as to rotate the table 71.

The supply device 5 includes a position detector 38 for detecting the rotation angle of the table 71. The position detector 38 is attached to the table drive motor 36, for example. The position detector 38 can detect the rotation angle of the table 71 with reference to a predetermined position. The supply control device 31 can detect the rotation angle around the rotation axis 80 of the table 71 based on the output of the position detector 38. In short, the supply control device 31 can detect the phase of the table 71 at an arbitrary time.

The operation control unit 32 transmits an operation command based on the operation program to the conveyor drive circuit 22. The conveyor drive circuit 22 supplies electricity to the conveyor drive motor 25 based on the operation command. By driving the conveyor drive motor 25, the bolts 89 are transported by the conveyor 75. The operation control unit 32 transmits an operation command for driving the discharge part 76 to a distribution plate drive circuit 23 and a closing plate drive circuit 24. The distribution plate drive circuit 23 supplies electricity to the distribution plate drive motor 26 based on the operation command. The closing plate drive circuit 24 supplies electricity to the closing plate drive motor 27 based on the operation command. By driving the distribution plate drive motor 26, the bolts 89 transported by the conveyor 75 are distributed. By driving the closing plate drive motor 27, the closing plates 78, 79 of the discharge part 76 are opened or closed.

The control device of the transport device 1 includes an export control device 41 that controls the export device 6. The export control device 41 includes an operation control unit 42 for transmitting an operation command for the export device 6 based on the operation program. The operation control unit 42 transmits the operation command to the conveyor drive circuit 43. The conveyor drive circuit 4:3 supplies electricity to the conveyor drive motor 44 based on the operation command. By driving the conveyor drive motor 44, the pallet 82 placed on the conveyor 81 is moved.

The export device 6 includes a position detector 45 for detecting the movement amount of the conveyor 81. The position detector 45 is attached to the conveyor drive motor 44, for example. The operation control unit 42 can calculate the movement amount of the conveyor 81 based on the output of the position detector 45. In other words, the export control device 41 can detect the movement amount of the pallet 82.

The plurality of control devices in the present embodiment are configured to be able to communicate with each other. The robot control device 11 is configured to be able to mutually communicate with the supply control device 31, the imaging control device 51, and the export control device 41. In addition, the imaging control device 51 is configured to be mutually communicate with the supply control device 31. Although the plurality of control devices directly communicate with each other in the present embodiment, the embodiment is not limited to this. For example, the plurality of control devices may be configured to be able to communicate via a predetermined device. Alternatively, each control device may be connected to a PLC (Programmable Logic Controller), and each control device may be driven according to a command from the PLC.

The export control device 41 can drive the export device 6 based on the number of bolts 89 that the robot 2 has moved to the pallet 82. For example, when bolts 89 are disposed in all the hole 82a of the pallet 82 arranged at a predetermined position, the conveyor 81 can be driven by the movement amount corresponding to one pallet 82.

Figure 4:
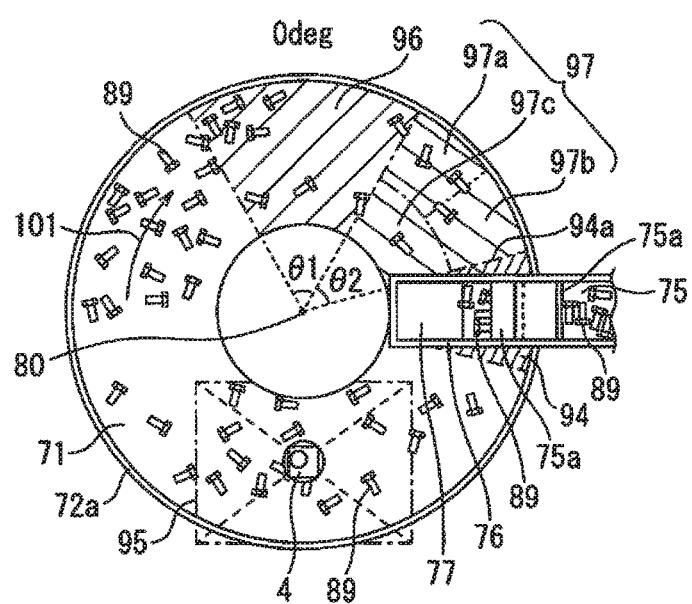
FIG. 4 is a first schematic plan view of a table for explaining the control for replenishing bolts.

FIG. 4 illustrates a first schematic plan view of a table explaining the control of the present embodiment. FIG. 4 illustrates a state in which the rotation angle (phase) of the table 71 is 0°. A replenishment region 94 in which bolts 89 are replenished by the replenishment device 21 is preset in the region in which the table 71 is arranged. The replenishment region 94 is set corresponding to the position where the discharge part 76 of the replenishment device 21 is disposed. In the present embodiment, the replenishment region. 94 is set directly under the discharge part 76. Here, in the present embodiment, the direction indicated by the arrow 101 in which the table 71 rotates with reference to the start line 94a of the replenishment region 94 is referred to as downstream. The bolt 89 moves downstream.

A detection region 95 for imaging the bolts 89 by the camera 4 is preset in the area where the table 71 is arranged. At least a portion of the detection region 95 is set downstream from the replenishment region 94. The detection region 95 can be set such that the entire radial direction (the entire width direction) of the table 71 may be imaged.

A gripping region 96 in which bolts 89 are gripped by the robot 2 is set in the region where the table 71 is arranged. The gripping region 96 is set downstream from the detection region 95. The gripping region 96 is disposed upstream from a determination region 97. The gripping region 96 of the present embodiment is set over the entire radial direction (the entire width direction) of the table 71.

The determination region 97 for determining the number of bolts 89 is predetermined in the region where the table 71 is arranged. The determination region 97 is set downstream from the gripping region 96. The determination region 97 is set upstream from the replenishment region 94. The divided regions 97a, 97b, and 97c that have been divided into a plurality are predetermined in the determination region 97. The determination region 97 is divided into two regions in the radial direction. That is, outside divided regions 97a and 97b and an inside divided region 97c are set. Further, two divided regions are set in the circumferential direction in the outer side region. In other words, the divided region 97a on the upstream side and the divided region 97b on the downstream side are set.

The radial length of the outside divided regions 97a and 97b corresponds to the radial length of the first storage chamber 76a of the discharge part 76. In addition, the radial length of the inside divided region 97c corresponds to the radial length of the second storage chamber 76b of the discharge part 76.

It should be noted that the replenishment region 94, the detection region 95, the gripping region 96, and the determination region 97 of the present embodiment are regions that do not move, even when the table 71 rotates.

In the transport device 1 of the present embodiment, the camera 4 images the bolts 89 in the detection region 95. The position and orientation of the bolts 89 are detected from the image captured by the camera 4. The robot 2 grips a bolt 89 based on the position and orientation of the bolt 89 in the gripping region 96. Then, the robot 2 places the bolt 89 on the pallet 82 of the export device 6.

Figure 5:
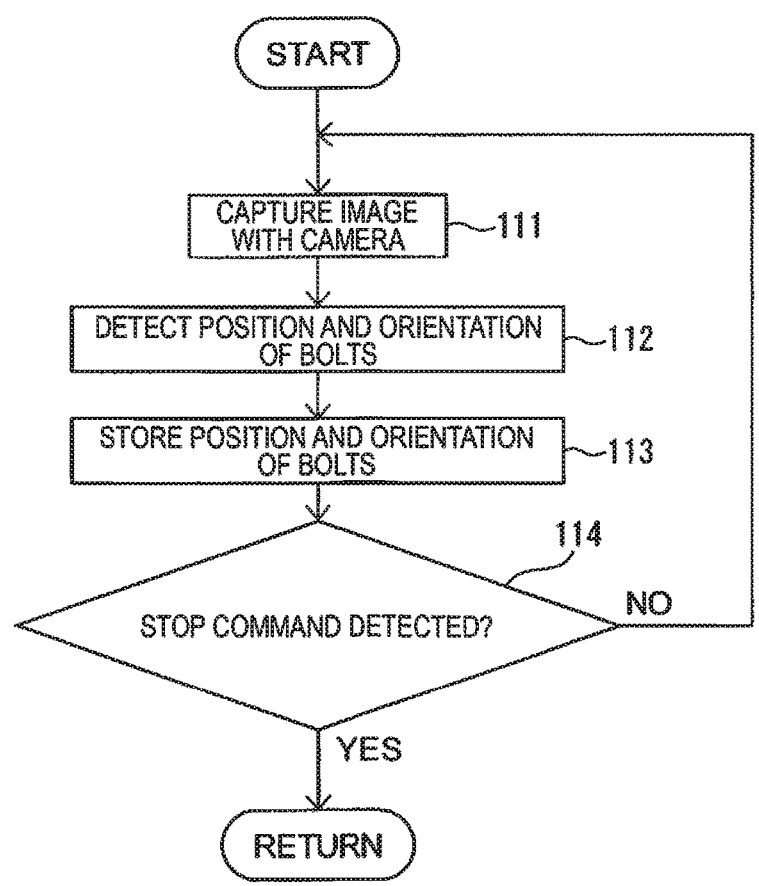
FIG. 5 is a flowchart explaining the control of an imaging device according to the embodiment.

FIG. 5 illustrates a flowchart of a control for capturing an image according to the present embodiment. With reference to FIG. 3 to FIG. 5, in step 111, the imaging control unit. 52 transmits an imaging command to the camera 4. The camera 4 captures an image of the detection region 95. In some cases, the image may include a bolt 89 placed on the table 71. The image captured by the camera 4 is transmitted to the image processing unit 53 of the imaging control device 5.

In step 112, the image processing unit 53 detects the position and orientation of the bolts 89 in the detection region 95. The position and orientation are detected for each bolt 89. The position of the bolt 89 includes the position on the table 71. For example, the image processing unit 53 acquires the rotation angle (phase) of the table 71 from the supply control device 31. The position of a bolt 89 includes the central angle in the table 71 when a predetermined position of the table 71 is used as a reference and the distance from the rotation axis 80. In addition, the orientation of a bolt 89 includes the direction in which the bolt 89 faces.

In step 113, the storage unit 54 stores information on the bolt, which includes the position and orientation of the bolt 89. The information on the bolts is generated for each bolt 89 and stored in the storage unit 54.

In step 114, it is determined whether or not a command for stopping the transport device 1 has been input. When a stop command is not detected, the control returns to step 111. Then, in step 111, the camera 4 captures an image. In this way, it is possible to repeat the image capture.

The imaging control unit 52 can transmit imaging commands at predetermined time intervals. Alternatively, the imaging control unit 52 can send the imaging command each time the table 71 rotates by a predetermined rotation angle. It is preferable that the camera 4 captures images at short intervals such that there are no parts of the table 71 that are not imaged. Then, in step 112 and step 113, the imaging control device 51 stores bolt information including the position and orientation of the bolts 89 in the detection region 95. The information on the bolts is transmitted to the robot control device 11. The robot control device 11 stores the position and orientation for all the bolts 89 supplied to the gripping region 96 in the storage unit 13.

In step 114, when the imaging control device 51 detects a stop command for the transport device 1, this control is terminated.

Figure 6:
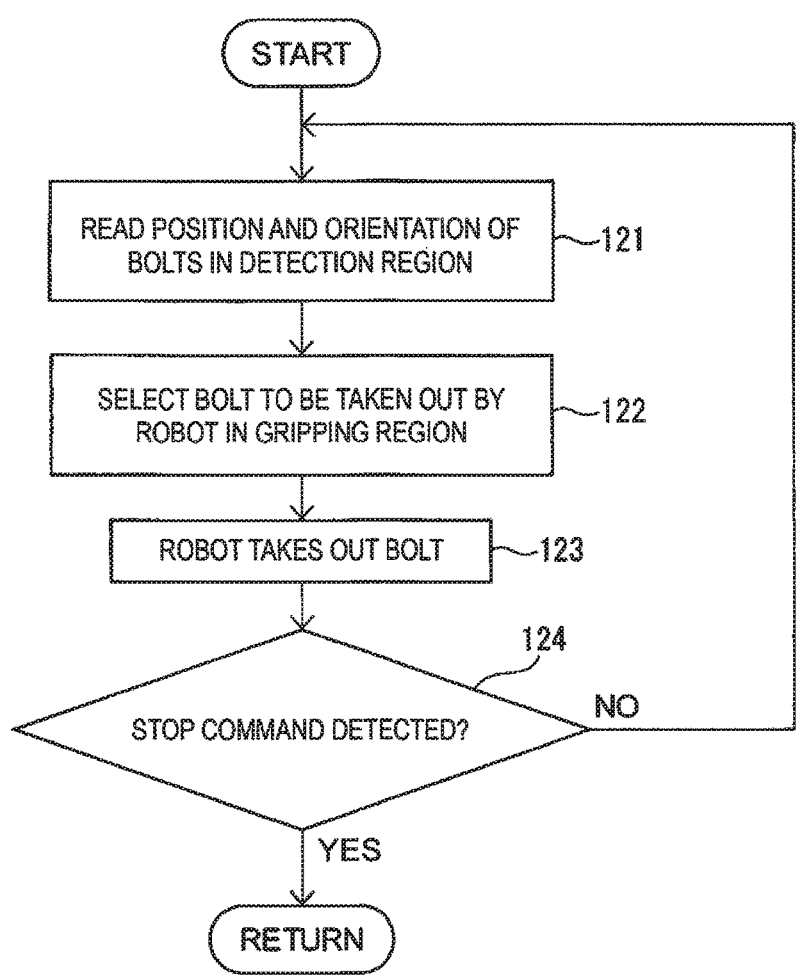
FIG. 6 is a flowchart explaining the control of the robot according to the embodiment.

FIG. 6 illustrates a flowchart of the control for the robot according to the present embodiment. With reference to FIG. 3, FIG. 4, and FIG. 6, the robot control device 11 includes a selection unit 14 for selecting the bolt 89 to be taken out by the robot 2 in the gripping region 96. In step 121, the selection unit 14 reads the information on the bolts from the storage unit 13. The selection unit 14 reads the position and orientation of the bolts 89 in the detection region 95 detected by the image processing unit 53.

In step 122, the selection unit 14 acquires the current rotation angle (phase) of the table 71 from the supply control device 31. The selection unit 14 detects all the bolts 89 disposed in the current gripping region 96 based on the current rotation angle of the table 71. In addition, the selection unit 14 calculates the position and orientation of the bolts 89 in the gripping region 96 based on the current rotation angle of the table 71 and the information on the bolt. The selection unit 14 in this embodiment can select an arbitrary bolt 89 disposed in the gripping region 96. For example, the selection unit 14 can preferentially select a bolt 89 disposed on the downstream side of the gripping region 96. When the bolt 89 to be taken out is selected by the selection unit 14, the control proceeds to step 123.

In step 123, the selection unit 14 transmits a command to the operation control unit 12 in order to take out the selected bolt 89. The selection unit 14 transmits the position and orientation of the bolt 89 in the gripping region 96 to the operation control unit 12. The operation control unit 12 drives the hand 3 and the robot 2 so as to take out the selected bolt 89. Then, the robot 2 takes out the bolt 89 and transports it to the pallet 82. It should be noted that the rotation of the table 71 may be temporarily stopped while the robot 2 takes out the bolt 89 from the table 71. For example, the rotation of the table 71 may be stopped at each predetermined rotation angle, and the robot 2 may take out the bolt 89.

Next, in step 124, the robot control device 11 determines whether or not a stop command for the transport device 1 has been input. When the robot control device 11 detects the stop command at step 124, this control is terminated. When the robot control device 11 does not detect the stop command, the control proceeds to step 121. Then, the next bolt 89 is taken out by executing the controls from step 121 to step 123.

Figure 7:
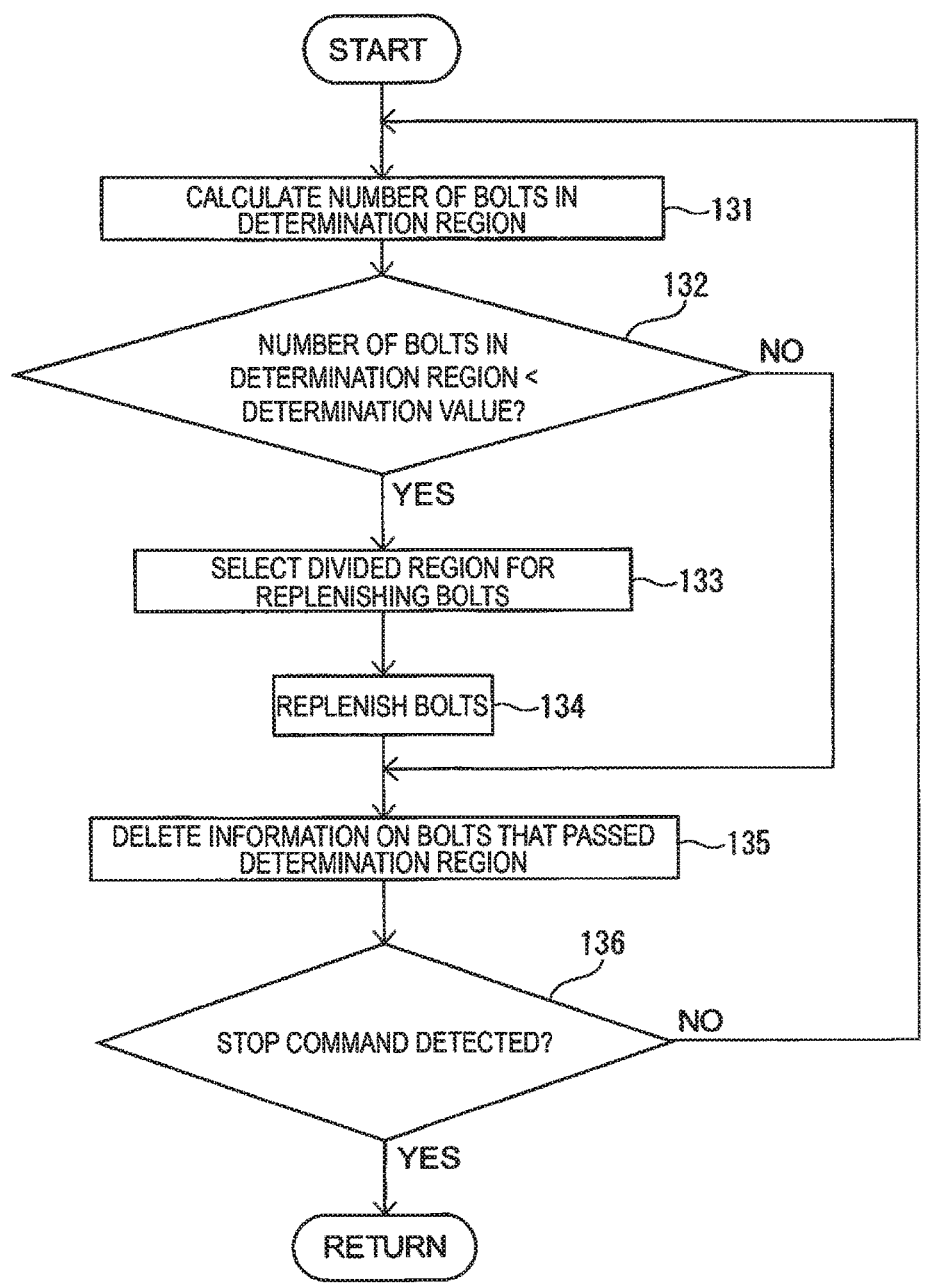
FIG. 7 is a flowchart explaining the control of the supply device according to the embodiment.
Figure 8:
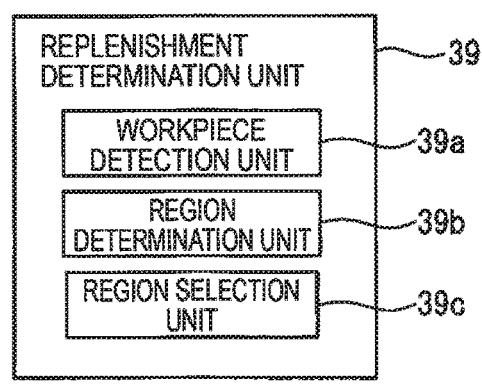
FIG. 8 is a block diagram of a replenishment determination unit of the supply control device according to the embodiment.

FIG. 7 illustrates a flowchart of the control of the supply device according to the present embodiment. The supply control device 31 controls the timing of replenishing bolts 89 to the table 71, and the position in the table 71. FIG. 8 illustrates a block diagram of the replenishment determination unit of the supply control device.

With reference to FIG. 3, FIG. 4, FIG. 7, and FIG. 8, the supply control device 31 includes a replenishment determination unit 39 that determines whether or not the bolts 89 are replenished to the table 71. The replenishment determination unit 39 includes a workpiece detection unit 39a for detecting the number of bolts 89 in the entire determination region 97 based on the information on the bolts detected by the image processing unit 53. In addition, the replenishment determination unit 39 includes a region determination unit 39b for determining whether or not the number of bolts 89 detected by the workpiece detection unit 39a is less than a predetermined determination value. Further, the replenishment determination unit 39 includes a region selection unit 39c that selects the divided region having the lowest workpiece number density from among the plurality of divided regions 97a, 97b, and 97c when the number of bolts 89 detected by the workpiece detection unit 39a is less than the determination value.

In step 131, the workpiece detection unit 39a calculates the number of bolts 89 disposed in the entire determination region 97. The bolts 89 that have not been gripped in the gripping region 96 move to the determination region 97. The workpiece detection unit 39a can delete the information on the bolts 89 taken out by the robot 2 from the information on the bolts 89 detected in the detection region 95. The workpiece detection unit 39a can calculate the number of bolts 89 currently disposed in the determination region 97 based on the current rotation angle of the table 71 and information on the bolts.

Next, in step 132, the region determination unit 39b determines whether or not the number of bolts 89 arranged in the determination region 97 is less than the predetermined determination value. In other words, it is determined whether or not the number density of the bolts 89 disposed in the determination region 97 is smaller than the predetermined determination value. The determination value is preemptively stored in the storage unit 33. In step 132, when the number of bolts 89 disposed in the determination region 97 is greater than or equal to the predetermined determination value, the control proceeds to step 135. In this case, it can be determined that a sufficient number of bolts 89 are disposed in the region of the table 71 corresponding to the determination region 97.

In step 132, when the number of bolts 89 disposed in the determination region 97 is less than the determination value, the control proceeds to step 133. In this case, it can be determined that the number of bolts 89 in the region of the table 71 corresponding to the determination region. 97 is few.

In step 133, the region selection unit 39c selects a divided region to be supplied with bolts 89 in the determination region 97. The area of each of the divided regions 97a, 97b, and 97c is predetermined. The region selection unit 39c detects the number of bolts 89 disposed in each of the divided regions 97a, 97b, and 97c. The region selection unit 39c calculates the number density of the bolts 89 for each of the divided areas 97a, 97b, and 97c based on the area of the divided areas and the number of bolts 89. The region selection unit 39c selects the divided region having the lowest number density of the bolts 89 from among the divided regions 97a, 97b, and 97c. It should be noted that, when there are two or more divided regions with the lowest number density of the bolts 89, the region selection unit 39c may select any of these divided regions. Alternatively, these two or more divided regions may be selected.

The region selection unit 39c sets a target region 99 on the surface of the table 71 to be replenished with bolts 89 so as to correspond to the selected divided region. Subsequently, the table 71 is rotated.

In step 134, the supply control device 31 controls the replenishment device 21 so as to replenish the bolts 89 to the target area 99 set by the region selection unit 39c. When the target area 99 is disposed directly under the discharge part 76, the bolts 89 are replenished from the discharge part 76. The operation control unit 32 of the supply control device 31 determines whether or not the target area 99 set on the placement surface of the table 71 is disposed in the replenishment region 94 based on the rotation angle of the table 71.

The replenishment determination unit 39 determines which storage chamber of the first storage chamber 76a or the second storage chamber 76b of the discharge part 76 corresponds to the target region 99. Then, the replenishment determination unit 39 transmits the operation command for driving the closing plate of the selected storage chamber to the operation control unit 32. The operation control unit 32 drives the closing plate drive motor 27 corresponding to the selected storage chamber based on the operation command. By adopting this control, it is possible to replenish bolts 89 to regions where the number density of the bolts 89 is small.

Next, in step 135, the information of the bolts passing through the determination region 97 and the target region 99 are deleted from the storage unit of each control device. The supply control device 31 deletes the target region and the information on the bolts 89 that have passed through the determination region 97. In addition, in the robot control device 11 and the imaging control device 51 as well, the information on the bolts 89 that have passed through the determination region 97 is deleted from the storage units 13 and 54.

Next, in step 136, the supply control device 31 determines whether or not a stop command for the transport device 1 has been detected. When the stop command has not been detected, the control proceeds to step 131. Then, the controls for replenishing the bolts 89 are repeated from step 131 to step 135. For example, the replenishment determination unit 39 can repeat the control from step 131 to step 136 for each predetermined rotation angle of the table 71. When the stop command is detected in step 136, this control is terminated.

Next, a specific example of the control for replenishing bolts will be described. With reference to FIG. 4, the imaging control device 51 detects the position and orientation of bolts 89 in the detection region 95. In the gripping region 96, the robot 2 performs an operation for taking out the bolt 89.

Figure 9:
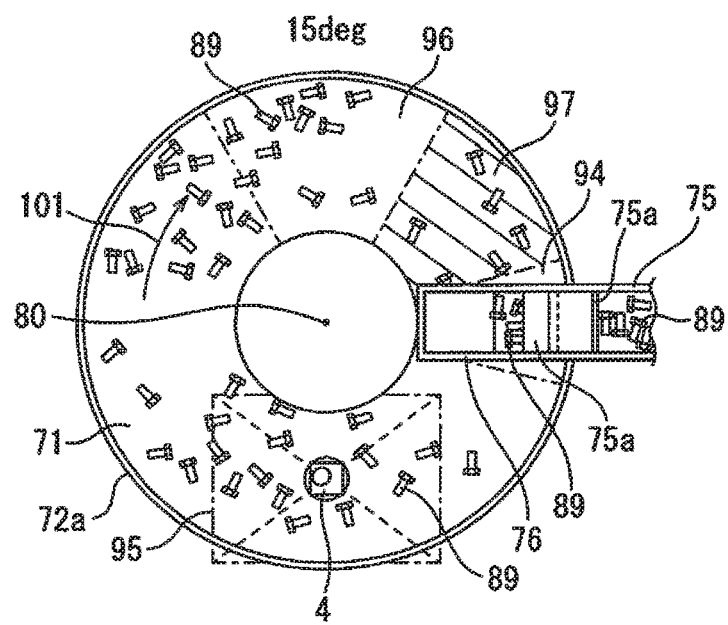
FIG. 9 is a second schematic plan view of the table for explaining the control of replenishing bolts.

FIG. 9 illustrates a second schematic plan view of a table for explaining the control of replenishing bolts. The table 71 illustrated in FIG. 9 is rotated by 15° from the state of the table 71 illustrated in FIG. 4. The rotation angle of the table 71 illustrated in FIG. 9 is 15°. In the present example, the supply control device 31 executes a control for determining whether or not the bolts 89 are replenished each time the table 71 rotates by 15°.

With reference to FIG. 7 to FIG. 9, in step 131, the workpiece detection unit 39a of the replenishment determination unit 39 detects the number of bolts 89 that are present in the determination region 97. The work detection unit 39a can detect the information on the bolts 89 disposed in the determination region 97 based on the information on the bolts detected in the detection region 95 and the information on the bolts taken out by the robot 2 in the gripping region 96. In addition, the workpiece detection unit 39a can detect the position and orientation of the bolts 89 that are currently present in the determination region 97 based on the rotation angle of the table 71. With respect to bolts that straddle the boundary line of the determination region 97, it may be determined that they are disposed inside of the determination region 97 or it may be determined that they are disposed outside of the determination region 97. In this example, it is determined that the bolts 89 that are disposed on the boundary line of the determination region 97 are disposed inside the determination region 97. In the example illustrated in FIG. 9, the workpiece detection unit 39a detects that six bolts 89 are present within the determination region 97.

In the present example, the determination value of the total number of bolts in the determination region 97 is set to 5. In step 132, the region determination unit 39b determines that the number of bolts 89 in the determination region 97 is greater than or equal to the determination value. Accordingly, the region determination unit 39b determines not to replenish the bolts 89, and the control proceeds to step 135. In step 135, the information on the bolts 89 that have passed through the determination region 97 is deleted. The control then passes through step 136 and returns to step 131. The table 71 rotates further.

Figure 10:
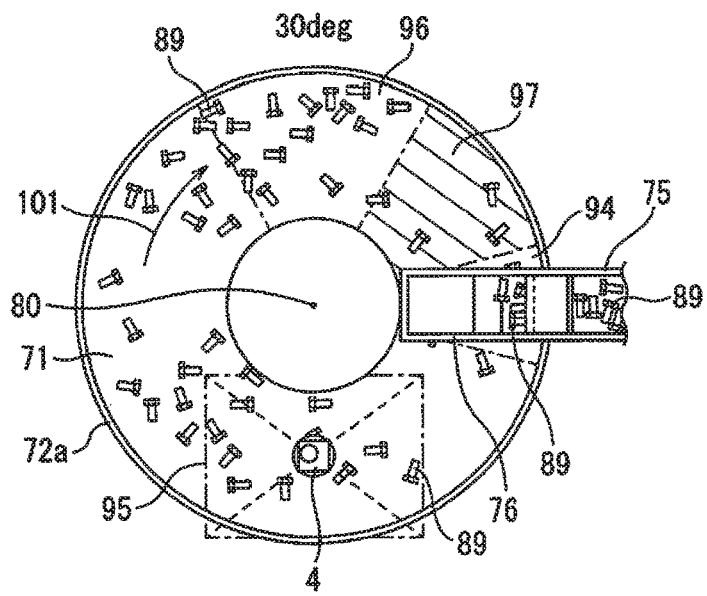
FIG. 10 is a third schematic plan view of the table for explaining the control of replenishing bolts.

FIG. 10 illustrates a third schematic plan view of a table for explaining the control of replenishing bolts. The rotation angle of the table 71 illustrated in FIG. 10 is 30°. With reference to FIG. 7, FIG. 8, and FIG. 10, in step 131, the workpiece detection unit 39a detects that four bolts 89 are present in the determination area 97. In step 132, the area determination unit 39b determines that the number of the bolts 89 in the determination region 97 is less than the determination value. The control then proceeds to step 133.

Figure 11:
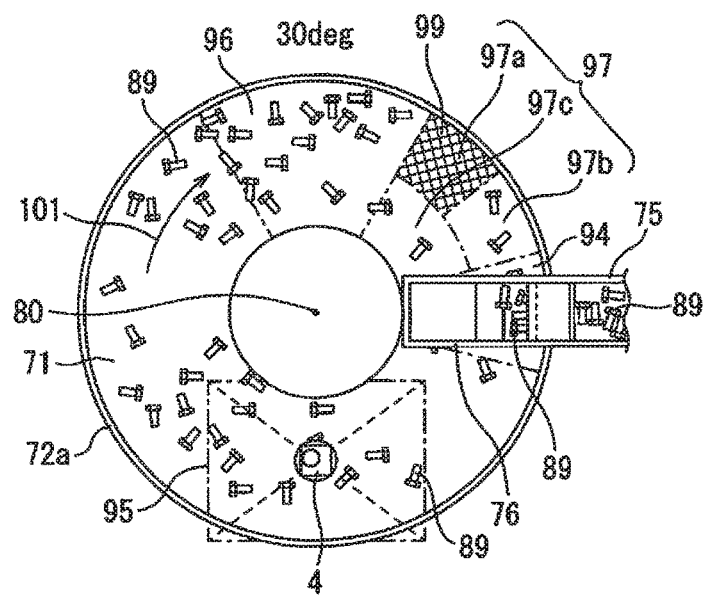
FIG. 11 is a fourth schematic plan view of the table for explaining the control of replenishing bolts.

FIG. 11 illustrates a fourth schematic plan view of a table for explaining the control of replenishing bolts. With reference to FIG. 7, FIG. 8, and FIG. 11, in step 133, the region selection unit 39c selects a divided region to which the bolts 89 will be replenished. The region selection unit 39c detects the number of bolts 89 disposed in each of the divided regions 97a, 97c, and 97b. Two bolts are disposed in the divided region 97c. Two bolts are disposed in the divided region 97b. In contrast, no bolts 89 are disposed in the divided region 97a. The region selection unit 39c calculates the number density of the bolts 89. Then, the region selection unit 39c determines that the density of the number of bolts is smallest in the divided region 97a. The region selection unit 39c sets a region on the table 71 that corresponds to the divided area 97a as the target region 99 to which the bolts 89 will be supplied. The position of the target region 99 and the current rotation angle of the table 71 are stored together in the storage unit 33. Then, the table 71 rotates.

Figure 12:
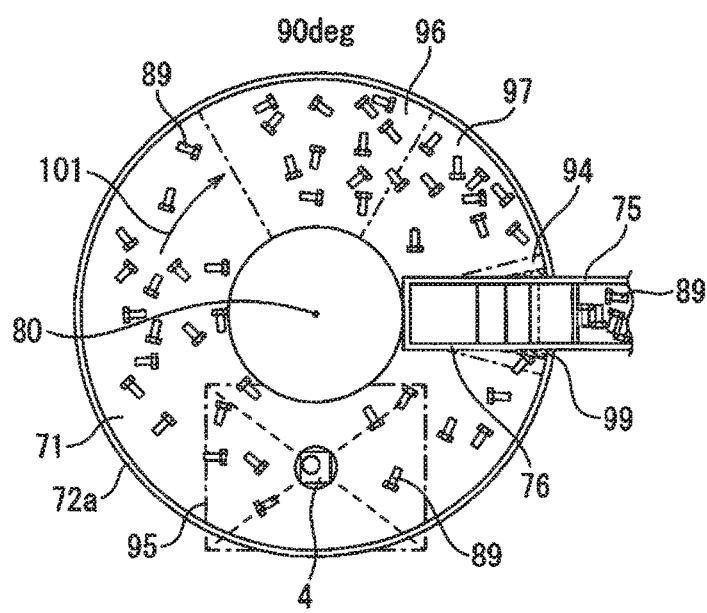
FIG. 12 is a fifth schematic plan view of the table for explaining the control of replenishing bolts.

FIG. 12 illustrates a fifth schematic plan view of a table for explaining the control of replenishing bolts. The rotation angle of the table 71 is 90° in the state illustrated in FIG. 12. With reference to FIG. 3, FIG. 7, FIG. 8, and FIG. 12, the target region 99 to which the bolts 89 are replenished is located directly below the discharge part 76 of the replenishment device 21. The supply control device 31 detects that the target region. 99 has reached the replenishment region 94. The region selection unit 39c transmits a command to the operation control unit 32 for supplying the bolts 89 to the outside region from among the inside region and the outside region. The operation control unit 32 executes a control to open the closing plate 78 of the first storage chamber 76a. As a result, the bolts 89 can be supplied to the target region 99 on the surface of the table 71.

The supply control device 31 executes a control for closing the closing plate 78 after discharging the bolts 89. The supply control device 31 can drive the distribution plate 77 and the conveyor 75 so as to replenish the bolts 89 to the first storage chamber 76a.

With reference to FIG. 1, in the robot. 2 according to the present embodiment, bolts 89 can be taken out from the inside portion to the outside portion of the table 71. The robot 2 can take out bolts 89 disposed in the entire gripping region 96. However, when the bolts 89 are densely crowded on the placement surface of the table 71, there are cases where it is difficult for the robot 2 to take out bolts 89. For example, when a plurality of bolts are in contact with one another, there are some cases where the bolts 89 cannot be gripped by the hand 3. For this reason, it is preferable that the plurality of bolts 89 be disposed at a distance from each other. In short, it is preferable that the plurality of bolts 89 are dispersed.

In contrast, when the number of bolts 89 disposed in the gripping region 96 is too few, the robot 2 will take out all the bolts 89 disposed in the gripping region 96. Thereafter, the robot 2 stops until bolts 89 are transported to the gripping region 96. As a result, the efficiency with which the robot 2 takes out bolts 89 decreases.

The supply device 5 according to the present embodiment supplies bolts to the divided region having a low number density of bolts in the determination region 97 after determining the total number of bolts 89 in the determination region 97. When the total number of the bolts 89 in the determination region 97 is greater than or equal to the determination value, it can be determined that a sufficient number of bolts 89 are disposed in the region of the table 71 corresponding to the current determination region 97. When the region of the table 71 corresponding to the current determination region 97 moves to the gripping region 96, it can be determined that the number of the bolts 89 is not few, and that the robot 2 will not stop.

In contrast, when the total number of the bolts 89 disposed in the determination region 97 is few, the replenishment determination unit. 39 selects the divided region with a low number density of the bolts 89. Bolts 89 can be replenished to regions where the number density of the bolts 89 is low. For this reason, it is possible to suppress the occurrence of the region where the bolts 89 are densely crowded. In other words, the bolts 89 can be disposed in a dispersed state.

The supply device 5 of the present embodiment can supply a sufficient number of bolts to the robot 2 such that the robot 2 does not stopped in a state where the bolts 89 are dispersed. The supply device 5 of the present embodiment can efficiently supply bolts 89 to the robot 2.

The discharge part 76 of the replenishment device 21 of the present embodiment has a plurality of discharge ports aligned in a row in a direction perpendicular to the rotation direction of the table 71. That is, the discharge part 76 has discharge ports aligned in a row in the radial direction. By adopting this configuration, it is possible to supply bolts 89 to any position from the inside region of the table 71 to the outside region with respect to the rotating table 71. The discharge part 76 can supply the bolts 89 to a plurality of positions with a simple configuration.

The divided regions 97a, 97b, and 97c according to the present embodiment are set by dividing the determination region 97 into two regions in the radial direction. The discharge part 76 includes two discharge ports in the radial direction. In this way, it is preferable that the discharge ports of the discharge part 76 are formed corresponding to the positions of the divided regions. For the divided regions of the present embodiment, the determination region 97 is divided into two regions in the radial direction and the outside region is further divided into two regions in the circumferential direction, however the embodiment is not limited to this. The divided region can be set by dividing the determination region by any method.

With reference to FIG. 4, the determination region 97 in the present embodiment has substantially the same size as the gripping region 96. In other words, the central angle $\theta 2$ of the determination region 97 is substantially the same as the central angle $\theta 1$ of the gripping region 96. By adopting this configuration, the number of bolts 89 determined in the determination region 97 corresponds to the number of bolts 89 disposed in the gripping region 96. For this reason, it is possible to more reliably suppress occurrence of the robot 2 stopping as a result of a reduction in the number of bolts 89 in the gripping region 96. For example, the determination value of the number of bolts 89 in the determination region 97 can be set to the number of bolts 89 that the robot 2 is capable of taking out during the period while the table 71 rotates by an angle θ2. It should be noted that the size of the determination region 97 may be larger or smaller than the gripping region 96.

Although the imaging device 50 including the camera 4 is utilized as the detection device configured to detect workpieces placed on the placement member of the present embodiment, the embodiment is not limited to this. Any device that is capable of detecting workpieces placed on the placement member can be utilized as the detection device. For example, a sensor that is capable of detecting workpieces, such as a three-dimensional distance sensor or a surface photoelectric sensor can be utilized as the detection device.

Although the control device of the transport device 1 according to the present embodiment includes a supply control device 31 for controlling the supply device 5, a robot control device 11 for controlling the hand 3 and the robot 2, an imaging control device 51 for controlling the camera, and an export control device 41 for controlling the export device 6, the embodiment is not limited to this. The control devices can be configured to control any device. For example, the robot control device may be configured to control the camera and the supply device.

Although a bolt is exemplified as a workpiece in the present embodiment, the embodiment is not limited to this. Any member can be used as a workpiece. For example, it is possible to adopt, as workpieces, fastening members such as screws, electronic parts to be mounted on a substrate, parts such as cases, and finished products.

In the present embodiment, although the workpieces taken out by the take-out device are exported by the export device, the embodiment is not limited to this. The take-out device can perform any manner of tasks by using the workpiece taken out from the supply device. For example, the robot can discriminate the type of parts based on the image of the workpieces, and transport parts to a predetermined location for each type of part. In short, the robot can divide the parts into predetermined types. Alternatively, the take-out device can attach the workpiece to the predetermined component. For example, when an electronic component is utilized as the workpiece, the robot can attach the electronic component to the surface of the substrate moved by the conveyor.

Although the take-out device of the present embodiment is a robot having a parallel link mechanism, the embodiment is not limited to this. Any device that is capable of taking out the workpiece from the supply device can be utilized as the take-out device. For example, a robot having a vertical multi-joint mechanism can be utilized as the take-out device. This robot may include, for example, a swivel base, a lower arm, an upper arm, and a wrist portion. Joints may be disposed between the swivel base and the lower arm, and also between the lower arm and the upper arm. A robot drive motor may be disposed in the joint. By driving the robot drive motor, the position and orientation of the robot change. Alternatively, a dedicated device having a linear motion mechanism for taking out the workpiece or the like can be utilized as the take-out device.

According to the aspects of the present disclosure, it is possible to provide the supply device and the transport device, which efficiently supply workpieces to the take-out device.

In each control described above, the sequence of steps may be changed as appropriate, within such a range that the functionality and operation are not changed. The above-described embodiments can be combined as appropriate.

Identical or equivalent parts are given identical reference numerals in each of the above-described drawings. Note that the above-described embodiments are merely examples and are not intended to limit the invention. Changes to the embodiments as indicated in the claims are also included in the embodiments.

The invention claimed is:

1. A supply device for supplying a workpiece to a take-out device taking out the workpiece, the supply device comprising:
   a placement member on which the workpiece placed;
   a drive motor rotating the placement member;
   a detection device detecting the workpiece placed on the placement member;
   a replenishment device replenishing the workpiece to a surface of the placement member; and
   a supply control device controlling the replenishment device; wherein
   the replenishment device is formed so as to be able to replenish the workpiece to a plurality of positions in a region where the placement member is disposed,
   a determination region for determining number of the workpieces is predetermined in the region where the placement member is disposed,
   a plurality of divided regions are predetermined in the determination region, and
   the supply control device includes a workpiece detection unit detecting number of the workpieces in the entire determination region based on information on the workpiece detected by the detection device, and a region selection unit selecting, when the number of the workpieces detected by the workpiece detection unit is less than a predetermined determination value, a divided region having a lowest number density of workpieces from among the plurality of divided regions, and controls the replenishment device so as to replenish the workpiece in a region of the placement member corresponding to the divided region selected by the region selection unit.

2. The supply device according to claim 1, wherein the replenishment device includes a discharge part having a plurality of discharge ports aligned in a row in a direction perpendicular to a rotation direction of the placement member, and replenishes the workpiece from a discharge port corresponding to the divided region selected by the region selection unit.

3. A transport device comprising:
   the supply device according to claim 1;
   a take-out device taking out the workpiece placed on the placement member; and
   a take-out control device controlling the take-out device; wherein
   the detection device is configured to detect a position and orientation of the workpiece,
   a detection region for detecting the position and orientation of the workpiece by the detection device and a gripping region in which a workpiece is gripped by the take-out device are predetermined in a region where the placement member is disposed, the gripping region is disposed downstream from the detection region in a direction in which the placement member rotates, and is disposed upstream from the determination region, and the take-out control device calculates the position and orientation of the workpiece in the gripping region based on the position and orientation of the workpiece in the detection region, and controls the take-out device so as to grip the workpiece based on the position and orientation of the workpiece in the gripping region.

4. The transport device according to claim 3, wherein the determination region is set to the same size as the gripping region.

5. The transport device according to claim 3, further comprising an export device exporting the workpiece taken out by the take-out device, wherein the take-out control device controls the take-out device so as to change a state of the workpiece taken out from the placement member to a predetermined direction and orientation and transport the workpiece to the export device.

\* \* \* \* \*